(12) United States Patent
Murphy et al.

(10) Patent No.: US 10,879,539 B2
(45) Date of Patent: Dec. 29, 2020

(54) MIXED METAL OXIDE COMPOUNDS AND ELECTROCATALYTIC COMPOSITIONS, DEVICES AND PROCESSES USING THE SAME

(71) Applicant: CORNELL UNIVERSITY, Ithaca, NY (US)

(72) Inventors: Marc Murphy, Blaine, MN (US); Ryo H. Wakabayashi, Santa Clara, CA (US); R. Bruce Van Dover, Ithaca, NY (US); Héctor D. Abruña, Ithaca, NY (US); Francis J. Disalvo, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 105 days.

(21) Appl. No.: 16/303,010

(22) PCT Filed: Jun. 7, 2017

(86) PCT No.: PCT/US2017/036356
§ 371 (c)(1),
(2) Date: Nov. 19, 2018

(87) PCT Pub. No.: WO2017/214274
PCT Pub. Date: Dec. 14, 2017

(65) Prior Publication Data
US 2019/0173097 A1   Jun. 6, 2019

Related U.S. Application Data

(60) Provisional application No. 62/346,629, filed on Jun. 7, 2016.

(51) Int. Cl.
*H01M 4/00* (2006.01)
*H01M 4/90* (2006.01)
(Continued)

(52) U.S. Cl.
CPC ......... *H01M 4/9016* (2013.01); *H01M 8/083* (2013.01); *H01M 8/1004* (2013.01); *H01M 12/08* (2013.01); *Y02E 60/10* (2013.01)

(58) Field of Classification Search
CPC .. H01M 8/1004; H01M 12/08; H01M 4/9016; H01M 8/083; Y02E 60/128
See application file for complete search history.

(56) References Cited

U.S. PATENT DOCUMENTS 4,289,591 A   9/1981   Davidson et al.
4,347,166 A   8/1982   Tosaki et al.
(Continued)

FOREIGN PATENT DOCUMENTS

EP   0135475 A1   3/1985
EP   2581971 A1   4/2013
(Continued)

OTHER PUBLICATIONS

Takahara, Isao et al., "Activity and deactivation nature of Ru/MnCO₃ catalysts for Fischer-Tropsch reaction," Applied Catalysis A:General, 430, 2013, pp. 80-87.
(Continued)

*Primary Examiner* — Cynthia H Kelly
*Assistant Examiner* — Monique M Wills
(74) *Attorney, Agent, or Firm* — Heslin Rothenberg Farley & Mesiti P.C.

(57) ABSTRACT

A metal oxide compound of formula (I):

$$Mn_xM_yRu_{1-(x+y)}O_2 \qquad (I)$$

is a single phase rutile-type structure, where M is Co, Ni, or Fe, or a combination thereof, $x>0$, $y\geq 0$, and $0.02\leq(x+y)\leq 0.30$. Related electro-catalysts, devices, and processes are also provided.

20 Claims, 11 Drawing Sheets

(51) Int. Cl.
*H01M 8/083* (2016.01)
*H01M 8/1004* (2016.01)
*H01M 12/08* (2006.01)

(56) References Cited

U.S. PATENT DOCUMENTS

| | | | |
|---|---|---|---|
| 4,360,416 A * | 11/1982 | Davidson | C25B 1/46 204/263 |
| 4,419,278 A | 12/1983 | Gordon | |
| 4,585,540 A | 4/1986 | Beer et al. | |
| 4,765,874 A | 4/1988 | Modes et al. | |
| 5,977,017 A | 11/1999 | Golden | |
| 7,514,055 B2 | 4/2009 | Golden | |
| 2003/0198582 A1 | 10/2003 | Golden | |
| 2005/0092687 A1 | 5/2005 | Scheckel et al. | |
| 2011/0024687 A1 | 2/2011 | White et al. | |
| 2011/0015356 A1 | 6/2011 | Adzic et al. | |
| 2013/0230794 A1 | 9/2013 | Mondal et al. | |
| 2013/0250483 A1 | 9/2013 | Lin et al. | |
| 2014/0023940 A1* | 1/2014 | Zaghib | H01M 4/382 429/405 |
| 2014/0213441 A1 | 7/2014 | Trudel et al. | |
| 2015/0148216 A1 | 5/2015 | Nazarpoor et al. | |
| 2015/0292095 A1 | 10/2015 | Haber et al. | |

FOREIGN PATENT DOCUMENTS

| | | |
|---|---|---|
| GB | 859937 | 1/1961 |
| KR | 1020160014943 A | 2/2016 |
| WO | 2012/018818 A1 | 2/2012 |

OTHER PUBLICATIONS

International Search Report and Written Opinion of the International Searching Authority for PCT/US2017/036356 dated Sep. 6, 2017.

Browne, M.P., et al., "Low-Overpotential High-Activity Mixed Manganese and Ruthenium Oxide Electrocatalysts for Oxygen Evolution Reaction in Alkaline Media", ACS Catalysts, vol. 6, pp. 2408-2415 (2016).

Wen, J., et al., "Preparation and electrochemical performance of novel ruthenium-manganese oxide electrode materials for electrochemical capacitors", Journal of Physics and Chemistry of Solids, vol. 70, pp. 816-820 (2009).

* cited by examiner

MIXED METAL OXIDE COMPOUNDS AND ELECTROCATALYTIC COMPOSITIONS, DEVICES AND PROCESSES USING THE SAME

CROSS-REFERENCE TO RELATED APPLICATIONS

This application is a U.S. national phase entry under Section 371 of International Application No. PCT/US2017/036356, filed on Jun. 7, 2017, which published as WO 2017/214274 A1, which claims priority to U.S. Provisional Patent Application No. 62/346,629, filed Jun. 7, 2016. The entire contents of each of the prior applications are hereby incorporated by reference herein.

GOVERNMENT FUNDING

This invention was made with Government support under Grant Number IIS-1344201 awarded by the National Science Foundation (NSF). The United States Government has certain rights in the invention.

FIELD OF THE INVENTION

This invention relates to, inter alia, metal oxide compounds and related compositions, devices, and processes.

BACKGROUND

Existing electro-catalysts used for oxygen reduction reaction (breakdown of oxygen to produce water, abbreviated as ORR), and oxygen evolution reaction (production of oxygen from water, abbreviated as OER), often make use of expensive components, such as platinum (Pt).

Thus, a need exists for improved and otherwise alternative electro-catalysts that offer more economic and/or efficient options compared to commercially available catalysts.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

Briefly, the present invention satisfies the need for, inter alia, improved and/or alternative electro-catalysts.

The invention provides a new material, comprising an intermixed singe-phase oxide compound comprising manganese (Mn) and ruthenium (Ru).

Embodiments of the invention may address one or more of the problems and deficiencies discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

Certain embodiments of the presently-disclosed metal oxide compounds and related compositions, devices, and processes have several features, no single one of which is solely responsible for their desirable attributes. Without limiting the scope of the metal oxide compounds and related compositions and processes as defined by the claims that follow, their more prominent features will now be discussed briefly. After considering this discussion, and particularly after reading the section of this specification entitled "Detailed Description of the Invention," one will understand how the features of the various embodiments disclosed herein provide a number of advantages over the current state of the art. These advantages may include, without limitation, providing compounds that allow for efficient catalysis for oxygen reduction reactions (breakdown of oxygen to produce water, abbreviated as ORR), and/or oxygen evolution reaction (production of oxygen from water, abbreviated as OER); both reaction processes are essential for, e.g., high-performing fuel cell and lithium-air battery applications. For example, various embodiments of the inventive metal oxide compounds have catalytic performance that is competitive with the commercial standard catalysts that are currently implemented in low temperature fuel cells (platinum), catalytic converters (platinum), and oxygen sensors. These commercial catalysts generally contain highly expensive precious metals such as platinum and platinum alloys. In addition, embodiments of the inventive metal oxide compounds can be used as catalysts, the cost of which represents only a fraction of the cost of commercial catalysts.

In a first aspect, the invention provides a metal oxide compound of formula (I):

$$Mn_xM_yRu_{1-(x+y)}O_2 \qquad (I)$$

wherein the compound is a single phase rutile-type structure, and wherein
M is selected from the group consisting of Co, Ni, and Fe, and combinations thereof;
$x > 0$;
$y \geq 0$; and
$0.02 \leq (x+y) \leq 0.30$.

In a second aspect, the invention provides an electro-catalyst comprising a metal oxide compound according to the first aspect of the invention (of formula (I)).

In a third aspect, the invention provides a film comprising the metal oxide compound according to the first aspect of the invention.

In a fourth aspect, the invention provides a solid particle comprising the metal oxide compound according to the first aspect of the invention, or the electro-catalyst according to the second aspect of the invention.

In a fifth aspect, the invention provides a membrane electrode assembly (MEA) comprising the metal oxide compound according to the first aspect of the invention, or the electro-catalyst according to the second aspect of the invention.

In a sixth aspect, the invention provides a fuel cell comprising the metal oxide compound according to the first aspect of the invention, or the electro-catalyst according to the second aspect of the invention.

In a seventh aspect, the invention provides an electro-catalytic process comprising use of the metal oxide compound according to the first aspect of the invention or the electro-catalyst according to the second aspect of the invention.

In an eighth aspect, the invention provides an anode or a cathode comprising the metal oxide compound according to the first aspect of the invention, or the electro-catalyst according to the second aspect of the invention.

In a ninth aspect, the invention provides a battery comprising the metal oxide compound according to the first aspect of the invention, or the electro-catalyst according to the second aspect of the invention.

In a tenth aspect, the invention provides an anode for a water electrolysis cell comprising the metal oxide compound according to the first aspect of the invention, or the electrocatalyst according to the second aspect of the invention.

These and other objects, features, and advantages of this invention will become apparent from the following detailed description of the various aspects of the invention taken in conjunction with the accompanying drawings.

BRIEF DESCRIPTION OF THE DRAWINGS

The present invention will hereinafter be described in conjunction with the following drawing figures. The depicted figures serve to illustrate various embodiments of the invention. However, the invention is not limited to the precise arrangements and instrumentalities of the embodiments depicted in the drawings.

DETAILED DESCRIPTION OF THE INVENTION

Figure 1:
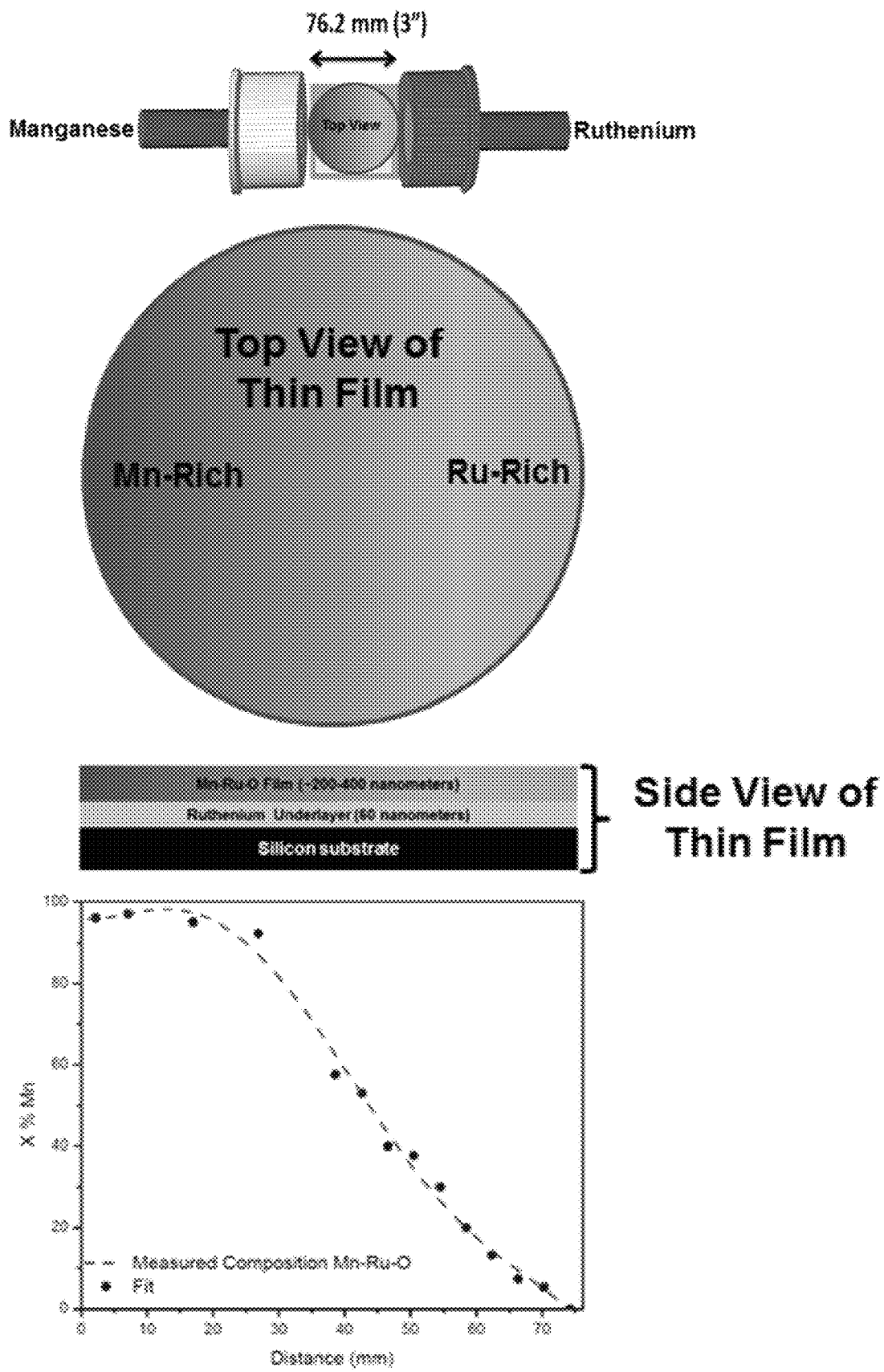
FIG. 1 depicts (top) an illustration of off-axis sputtering, and the resulting $Mn_xRu_{1-x}O_2$ composition spread thin film ($2^{nd}$ from the top). ($3^{rd}$ from top) The film stack is composed of a non-uniform $Mn_xRu_{1-x}O_2$ composition spread on top of a ~60 nanometer thick metallic ruthenium underlayer that was deposited onto a commercial 3" diameter silicon wafer. (Bottom) The resulting composition spread varies in Mn content ranging from ~2 to ~95 atomic % Mn relative to the total amount of Mn and Ru (i.e., x=0.02 to 0.95).

The present invention relates to, inter alia, metal oxide compounds and related compositions, articles, and processes.

Aspects of the present invention and certain features, advantages, and details thereof are explained more fully below with reference to the non-limiting embodiments discussed and illustrated in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and not by way of limitation. Various substitutions, modifications, additions and/or arrangements within the spirit and/or scope of the underlying inventive concepts will be apparent to those skilled in the art from this disclosure.

In a first aspect, the invention provides a metal oxide compound of formula (I):

$$Mn_xM_yRu_{1-(x+y)}O_2 \quad (I)$$

wherein the compound is a single phase rutile-type structure, and wherein M is selected from the group consisting of Co, Ni, and Fe, and combinations thereof;
x>0;
y≥0; and
0.02≤(x+y)≤0.30.

The metal oxide compounds provided herein are intermixed manganese (Mn) and ruthenium (Ru) single-phase oxide compounds that can optionally comprise one or more additional metals, M, selected from cobalt (Co), nickel (Ni), and iron (Fe). Embodiments of the metal oxide compounds find use, for example, as electro-catalysts.

The metal oxide compound has a single phase rutile-type structure.

As used herein, "rutile-type structure" refers to a crystal structure having substantially the same crystal structure (rutile) as $RuO_2$, meaning that the crystal structure is the same as rutile $RuO_2$, or deviates slightly therefrom, but only insofar that the metal oxide compound of formula (I) remains a single phase oxide.

"Single phase" means a material that exhibits a single crystal structure, even in the presence of differing elements. Persons having ordinary skill are well accustomed to methods of determining whether a compound remains in a single phase, which can be done, for example, using X-Ray diffraction (XRD) analytical techniques.

In the metal oxide compound of formula (I), x and y are the atomic fraction of Mn and M, respectively, relative to the sum of Mn, M, and Ru (i.e., the sum of the atomic fractions of Mn, M, and Ru=1 (100 atomic %)). Unless otherwise specified or apparent, these designations are used throughout this text. As is known by persons having ordinary skill in the art, atomic fractions can be calculated according to the formula: $N_i/N_{tot}$, where $N_i$ is the number of atoms of interest (e.g., for x, the number of atoms of Mn), and $N_{tot}$ is the total number of atoms of Mn, M, and Ru in the metal oxide compound. By multiplying the atomic fraction ($N_i/N_{tot}$) by 100%, one obtains the atomic percent of Mn, M, or Ru. For example, where x is 0.20, 20 atomic % of the total atoms of Mn, M, and Ru in a metal oxide compound are Mn, and the remaining 80 atomic % are comprised of Ru and, where present, M.

In the metal oxide compound of formula (I), oxygen (O) is provided with a subscript (n) of 2. In some embodiments, n is precisely equal to 2. However, the oxidation states of the metal within the mixed metal oxide compounds can vary slightly. Accordingly, persons having ordinary skill in the art will readily appreciate that, while n, when rounded to the nearest integer, will equal 2, it is possible for n to deviate somewhat from 2, depending on, e.g., the oxidation state of Mn present in the compounds. Indeed, often, oxides can have what are called oxygen vacancies in order to maintain charge balance. Based on the defined range of Mn as disclosed herein, the subscript on the oxygen in the inventive formulae (n=2) should be understood as being equal to n-z, wherein n is 2 and 0≤z<0.28 (i.e., the inventive compounds fall within the formula $Mn_xM_yRu_{1-(x+y)}O_{(n-z)}$).

For compounds of formula (I), x>0, and thus Mn is always present.

In some embodiments, x is 0.02 to 0.30 (e.g., 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30), including any and all ranges and subranges therein (e.g., 0.02 to 0.28, 0.10 to 0.20, etc.).

For compounds of formula (I), y≥0, thus M is optionally present.

In some embodiments, y is 0 to 0.28 (e.g., 0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, or 0.28), including any and all ranges and subranges therein (e.g., 0 to 0.28, 0 to 0.22, 0 to 0.20, 0 to 0.15, 0 to 0.10, 0.02 to 0.28, 0.02 to 0.22, 0.02 to 0.20, 0.02 to 0.15, 0 to 0.10, etc.).

Where y>0, M is present (i.e., Co, Ni, Fe, or a combination thereof is present). Embodiments of such compounds are those of formula (I'):

$$Mn_xM_yRu_{1-(x+y)}O_2 \quad (I')$$

wherein y>0, and x is as described above with reference to formula (I).

In some embodiments, y>0 and M is Co.
In some embodiments, y>0 and M is Ni.
In some embodiments, y>0 and M is Fe.
In some embodiments, y>0 and M is a combination of two or more (e.g., two) of Co, Ni, and Fe. In some embodiments, M is a combination of Co and Ni. In some embodiments, M is a combination of Co and Fe. In some embodiments, M is a combination of Ni and Fe.

In some embodiments, where M is a single element or a combination of two or more of Co, Ni, and Fe, M represents a composition according to equation (1):

$$M = Co_aNi_bFe_c \quad (1)$$

wherein a, b, and c are the atomic %'s of Co, Ni, and Fe, respectively, in M, relative to the total atoms in M (i.e., a+b+c=100 atomic % of M). In compositions of equation (1), each of a, b, and c is individually selected from 0 to 100 atomic % of M (e.g., 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 atomic % of M), including any and all ranges and subranges therein. For example, in an embodiment of formula (I) where y=0.05, M represents 5 atomic % of the total amount of Mn, M, and Ru present in the metal oxide compound. In such a compound, if a=50 atomic % of M, b=50 atomic % of M, and c=0 atomic % of M, then $M = Co_{50}Ni_{50}Fe_0$, or $Co_{50}Ni_{50}$. In other words, in this embodiment where a and b each=50, half of the atomic % of M is Co, and the other half is Ni. Thus, since y=0.05, the atomic % of each of Co and Ni in the embodiment, relative to the sum of M, Mn, and Ru, is ½y, or 2.5 atomic %.

In some embodiments, M is present, and the compound according to formula (I) is a quaternary compound comprising a single element selected from Co, Ni, and Fe. In some embodiments of the quaternary compound, M is Co. In some embodiments of the quaternary compound, M is Ni. In some embodiments of the quaternary compound, M is Fe.

Where y=0, M is not present. Embodiments of such compounds are ternary Mn—Ru—O metal oxide compounds of formula (I"):

$$Mn_xRu_{1-x}O_2 \quad (I'')$$

wherein 0.02≤x≤0.30 (i.e., the atomic % of Mn is 2-30% relative to the sum of Mn and Ru).

In some embodiments of compounds according to formula (I), all or substantially all (i.e., greater than or equal to 90%, e.g., greater than or equal to 90, 91, 92, 93, 94, 95, 96, 97, 98, or 99%) of Mn atoms present in the compound are atomically incorporated into the rutile-type structure.

In a second aspect, the invention provides an electro-catalyst comprising a metal oxide compound according to the first aspect of the invention (of formula (I)).

In some embodiments, the electro-catalyst is for use under alkaline conditions (i.e., pH>7).

In some embodiments, the electro-catalyst is a metal oxide compound according to formula (I').

In some embodiments, the electro-catalyst is a metal oxide compound according to formula (I").

In some embodiments, the electro-catalyst does not comprise $MnO_2$ by itself.

In some embodiments, the electro-catalyst does not comprise Ptf.

In some embodiments, the electro-catalyst does not comprise a rare earth metal.

In a third aspect, the invention provides a film comprising the metal oxide compound according to the first aspect of the invention.

In some embodiments, the film has a thickness of 150 to 400 nm (e.g., 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, or 400 nm), including any and all ranges and subranges therein.

In some embodiments, the film comprises, as the only active constituent (i.e., the only constituent contributing to ORR or OER activity), the metal oxide compound according to the first aspect of the invention, or the electro-catalyst according to the second aspect of the invention.

Manufacturing processes that are conducive to making films are well-known to persons having ordinary skill in the art, who can readily select an appropriate method by which to make the film. In some embodiments, the film is made using a reactive sputtering or vapor deposition technique. However, film deposition is not limited to sputtering. Other non-limiting deposition methods include pulsed laser deposition, atomic layer deposition, ink jet coating, etc.

In a fourth aspect, the invention provides a solid particle comprising the metal oxide compound according to the first aspect of the invention, or the electro-catalyst according to the second aspect of the invention.

In some embodiments the solid particle has a diameter of 1 nm to 100 μm (e.g., 1 nm, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, or 990 nm, or 1 μm, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 μm), including any and all ranges and subranges therein.

In some embodiments, the solid particle consists of the metal oxide compound according to the first aspect of the invention, or the electro-catalyst according to the second aspect of the invention.

In some embodiments, the solid particle comprises, as the only active constituent (e.g., the only constituent contributing to ORR or OER activity), the metal oxide compound according to the first aspect of the invention, or the electro-catalyst according to the second aspect of the invention.

Manufacturing processes that are conducive to making solid particles are well-known to persons having ordinary skill in the art, who can readily select an appropriate method by which to make the solid particle. In some embodiments, the solid particles are made using high-pressure/hydrothermal particle synthesis methods.

In some embodiments, the particles are used to make a suspension (in some embodiments, this can be thought of as, e.g., an "ink") to coat a substrate, such as an electrode. For example, in some embodiments, a suspension is formed by mixing an ionomer (e.g., about 0.02 weight %) in alcohol or a combination of alcohol and water (e.g., in 200 proof ethanol). Active material (e.g., particles according to embodiments of the invention) can be sonicated with the ionomer/ethanol solution to form a uniform ink/suspension using a probe. In some embodiments, the ink is deposited/casted on substrate (e.g., an electrode), thereby allowing a catalyst layer to be pasted on a substrate. This technique and modifications thereof can be useful, for example, for "painting" a catalyst layer for, e.g., membrane electrode assembly (MEA).

In a fifth aspect, the invention provides a membrane electrode assembly (MEA) comprising the metal oxide compound according to the first aspect of the invention, or the electro-catalyst according to the second aspect of the invention.

An MEA is an assembled stack of proton exchange membranes (PEM) or alkali anion exchange membrane (AAEM), catalyst and flat plate electrode used in fuel cells and electrolyzers.

In some embodiments, the MEA comprises, as the only active constituent (e.g., the only constituent contributing to ORR or OER activity), the metal oxide compound according to the first aspect of the invention, or the electro-catalyst according to the second aspect of the invention.

Most commercial fuel cells today are proton-exchange membrane (PEM) fuel cells, and are acidic in nature. In addition to alkaline media, embodiments of compounds of formula (I) are also catalytically active in acidic media, or more specifically, commercial PEM electrolytes such as Nafion.

In some embodiments, fuel cells and MEAs according to the invention do not comprise a PEM.

In some embodiments, the invention provides a fuel cell exchange membrane that comprises a phosphonium alkaline membrane.

In a sixth aspect, the invention provides a fuel cell comprising the metal oxide compound according to the first aspect of the invention, or the electro-catalyst according to the second aspect of the invention.

In some embodiments, the fuel cell comprises Pt. In some embodiments, the fuel cell does not comprise Pt.

In some embodiments, the fuel cell comprises a fluoropolymer. In some embodiments, the fuel cell does not comprise a fluoropolymer.

In some embodiments, the fuel cell is an alkaline fuel cell.

Persons having ordinary skill in the art are readily familiar with the overall architecture of embodiments of fuel cells, e.g., alkaline fuel cells. The architecture of various alkaline fuel cells according to embodiments of the invention, comprising a compound of formula (I), does not change from a typical fuel cell with Pt or Pt-containing nanoparticles as the cathode catalyst. Components including but not limited to bipolar plates, gas diffusion layers, separator membrane, and carbon supports can all be used. The same methods used to load Pt cathode catalysts into a commercial fuel cell may also be used in embodiments employing compounds of formula (I).

In some embodiments, a fuel cell stack comprises flow fields, backing layers, anode, cathode, and electrolytic membrane (proton or anion exchange). In some embodiments, compounds of formula (I) (e.g., catalyst particles of formula (I)), when mixed with a carbon support, are generally incorporated at the cathode/electrolytic membrane interface (e.g., the compound of formula (I) is used as a cathode catalyst).

While commercial fuel cell catalysts are primarily in the form of particles embedded into a conductive support material, and such embodiments are within the scope of the present invention, thin film deposition of catalyst material onto a substrate (e.g., a nanoscale substrate) is also a viable production step for fuel cells.

In some embodiments, fuel cells according to the invention are not acidic in nature.

In a seventh aspect, the invention provides an electro-catalytic process comprising use of the metal oxide compound according to the first aspect of the invention or the electro-catalyst according to the second aspect of the invention.

In some embodiments, the electro-catalytic process is performed at a pH greater than 7. For example, in some embodiments, the electro-catalytic process is performed at a pH of greater than 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0.

In some embodiments, the electro-catalytic process comprises an oxygen reduction reaction (ORR).

In some embodiments, the electro-catalytic process comprises an oxygen evolution reaction (OER).

In some embodiments, the electro-catalytic process comprises an oxygen reduction reaction (ORR) and an oxygen evolution reaction (OER).

In an eighth aspect, the invention provides an anode or a cathode comprising the metal oxide compound according to the first aspect of the invention, or the electro-catalyst according to the second aspect of the invention.

In particular embodiments, the anode or the cathode is for use in an alkaline environment.

In some embodiments, the invention provides an anode comprising the metal oxide compound according to the first aspect of the invention, or the electro-catalyst according to the second aspect of the invention.

In some embodiments, the invention provides a cathode comprising the metal oxide compound according to the first aspect of the invention, or the electro-catalyst according to the second aspect of the invention.

In a ninth aspect, the invention provides a battery comprising the metal oxide compound according to the first aspect of the invention, or the electro-catalyst according to the second aspect of the invention.

In some embodiments, the battery is an air battery (e.g., a lithium-air battery).

Strong interests in lithium-air battery technology and renewed interests in low temperature alkaline fuel cells result in a demand for new bifunctional cathode catalysts for oxygen reduction (ORR) and oxygen evolution (OER). The catalytic properties of $Mn_xM_yRu_{1-(x+y)}O_2$ as described herein satisfy the primary catalytic requirements for both applications at a significantly lower cost relative to commercially available catalysts. This is true for both ternary compounds and for quaternary+compositions (i.e., where y>0).

In various embodiments, the invention provides a metal-air battery using compounds of formula (I) as a cathode catalyst. Persons having ordinary skill in the art are readily familiar with constructions for embodiments of such batteries. In certain embodiments, the construction of the battery corresponds to that of an air battery as described by Rahman et al., High Energy Density Metal-Air Batteries: A Review. J. Electrochem. Soc. 2013, 160, A1759-A1771. While Rahman depicts lithium air batteries, a person having ordinary skill in the art can easily substitute another metal (e.g., zinc) in place of lithium. Upon reading this disclosure, persons having ordinary skill in the art will recognize that use of compounds of formula (I) does not require a fundamental change in the architecture of existing metal-air batteries, although it may enable different form factors based on the level of catalytic activity.

In a tenth aspect, the invention provides an anode for a water electrolysis cell comprising the metal oxide compound according to the first aspect of the invention, or the electro-catalyst according to the second aspect of the invention.

Since embodiments of compounds of formula (I) are effective catalysts for water oxidation/oxygen evolution reaction (OER), embodiments also represent viable options for anode material in water electrolysis cells. Persons having ordinary skill in the art will recognize that this material does not require a fundamental change in the architecture of existing water electrolysis cells, though it may enable different form factors based on the level of catalytic activity.

Examples

The invention will now be illustrated, but not limited, by reference to the specific embodiments described in the following examples.

Thin Film Fabrication

Using a deposition technique known as off-axis reactive radio frequency (RF) co-sputtering, a $Mn_xRu_{1-x}O_2$ composition spread thin film was fabricated. To enable electro-catalytic measurements, the $Mn_xRu_{1-x}O_2$ film was deposited onto a metal Ru-coated silicon substrate in order to improve the conductivity of the film. Without Ru coating or some other conductive coating, measurements of manganese-rich compositions can be convoluted by ohmic resistance because neither manganese oxide nor silicon is very conductive. While any material that is conductive would make a suitable underlayer, Ru was chosen because it does not chemically react with the $Mn_xRu_{1-x}O_2$ film that is on top of it, and Ru is catalytically inert for ORR unlike many precious metals such as platinum, gold and silver. The catalytic performance of the $Mn_xRu_{1-x}O_2$ film is not affected by the underlayer material; the choice of a Ru underlayer ensures certainty in the catalytic activity of the $Mn_xRu_{1-x}O_2$ film itself.

Mn and Ru materials were simultaneously deposited onto a heated (~350° C.) commercial 3" diameter silicon substrate that was pre-coated with a 60 nanometer thick Ru metal film (discussed above) in a low oxygen pressure ambient to form an oxide thin film. FIG. 1 depicts (top) an illustration of off-axis sputtering, and the resulting $Mn_xRu_{1-x}O_2$ composition spread thin film ($2^{nd}$ from the top). ($3^{rd}$ from top) The film stack is composed of a non-uniform $Mn_xRu_{1-x}O_2$ composition spread on top of a ~60 nanometer thick underlayer that was deposited onto a commercial 3" diameter silicon wafer. (Bottom) The resulting composition spread varies in Mn content ranging from ~2 to ~95 atomic % Mn relative to the total amount of Mn and Ru (i.e., x~0.02 to 0.95).

Prior to co-sputtering, the Ru-coated silicon substrate was left in the sputtering vacuum chamber until a base pressure of ~2×10$^{-6}$ Torr was reached. A steady flow of 40 sccm Ar and 10 sccm $O_2$ gas (20% $O_2$) was subsequently introduced until a steady partial pressure of 30 mTorr was maintained. The applied power to the Mn and Ru targets were set to 90 to 50 W at a distance of 12 and 15 mm from the edge of the film, respectively. Following a 10-15 minute pre-sputter step in order to clean the target surfaces and sustain a steady sputter rate, the film was co-sputtered for 20 minutes. The resultant film is a 150-400 nm thick crystallized $Mn_xRu_{1-x}O_2$ composition spread, where x ranges from about 0.02 to about 0.95 (see FIG. 1, bottom).

Because of the off-axis configuration of the sputtering guns, deposition of the $Mn_xRu_{1-x}O_2$ film is highly non-uniform in terms of film thickness across the entire film. This was intended. Co-deposition of Mn and Ru, when sputtered at opposite ends, enables the formation of a composition spread, where the Mn content relative to Ru is highest near the edge closest to the Mn sputtering gun (Mn-rich region;

see FIG. 1, 2$^{nd}$ from the top), and decreases away from the gun towards the Ru gun edge (Ru-rich region; see FIG. 1, 2$^{nd}$ from the top). As indicated above, the resulting Mn—Ru oxide composition spread has a composition range of ~2 to ~95 atom % Mn. This composition spread sample facilitates the utility of rapid screening techniques that can efficiently identify compositions that exhibit active oxygen reduction and evolution reaction kinetics.

Thin Film Catalytic Results

The $Mn_xRu_{1-x}O_2$ thin film prepared above, spanning a wide composition range wherein x ranges from about 0.02 to about 0.95, was tested for its catalytic activity. The results are shown in FIGS. 2 and 3.

Figure 2:
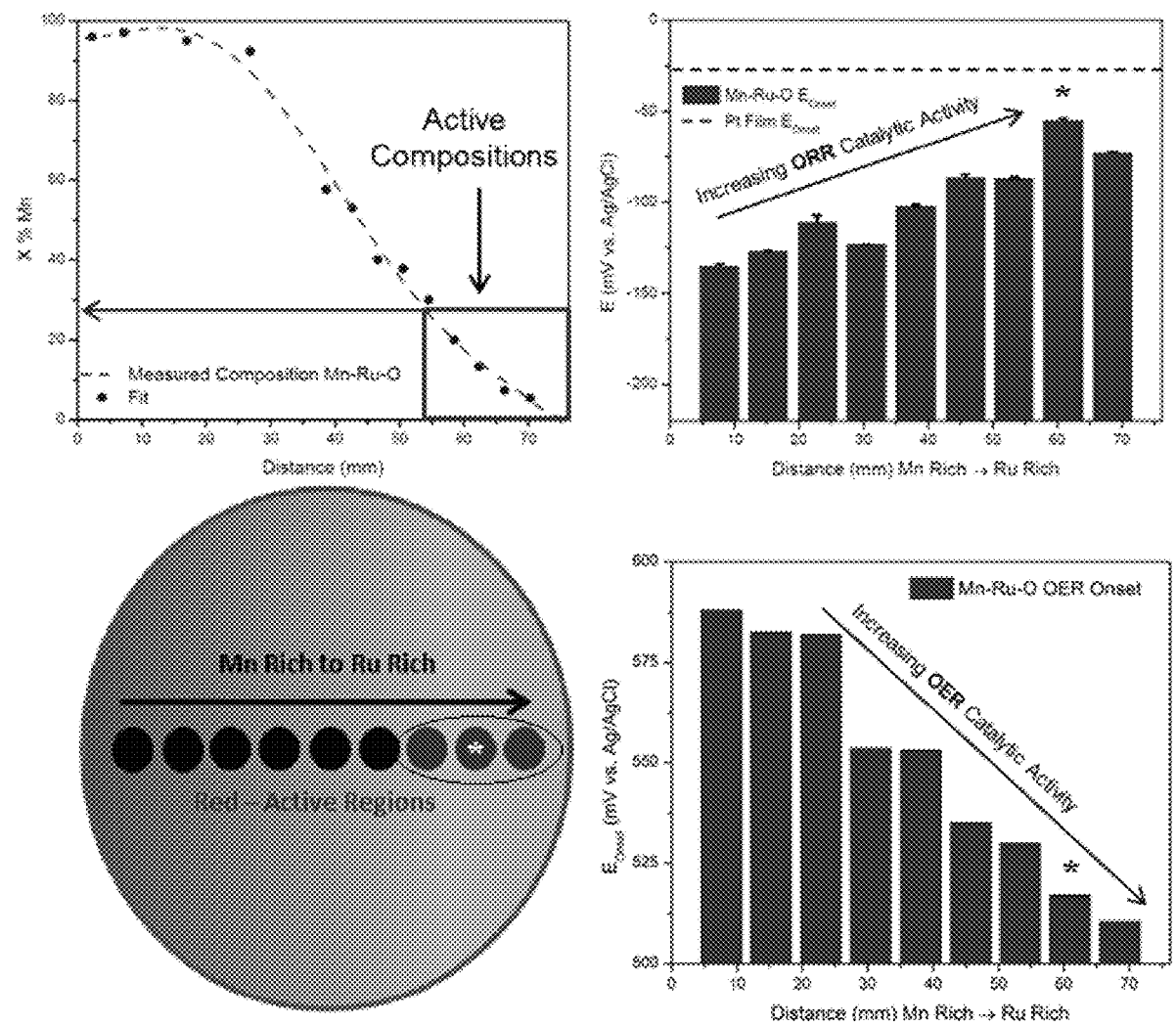
FIG. 2 depicts results of electrochemical testing for ORR and OER on compounds having different amounts of Mn and Ru from an embodiment of $Mn_xRu_{1-x}O_2$ film.

Multiple electrochemical measurements were taken locally across the Mn—Ru oxide composition spread thin film, which has a composition range of approximately 2-95 atom % Mn (FIG. 2, top-left). The composition range boxed in and indicated as "Active Compositions" (FIG. 2, top-left figure—approximately 2-28 atomic % Mn relative to the total Mn and Ru present, i.e., x=about 0.02 to about 0.28), is the region that is considered most catalytically active. Each spot that was tested on the film is illustrated by the bottom-left figure of FIG. 2. Spots that are circled (i.e., the three far-most right spots in the Ru rich region) signify highly active regions. The onset potentials ($E_{onset}$) for ORR were measured on each spot across the film, and plotted (FIG. 2, top-right). The criteria for ORR activity is based on how positive the onset potentials are (taller onset bars are more active for ORR). The dashed line in FIG. 2, top right, corresponds to a platinum (Pt) film, which is the performance benchmark material. Positive potential sweeps to resolve the onset potentials for OER currents (FIG. 2, lower-right) were also plotted. In the case of OER catalysis, the opposite criterion applies (less positive onsets are more active for OER). The "*" symbol (see FIG. 2, lower-left, top-right, and bottom-right) represents the most active tested spot along the composition spread, which subsequently underwent additional electrochemical tests.

Figure 3:
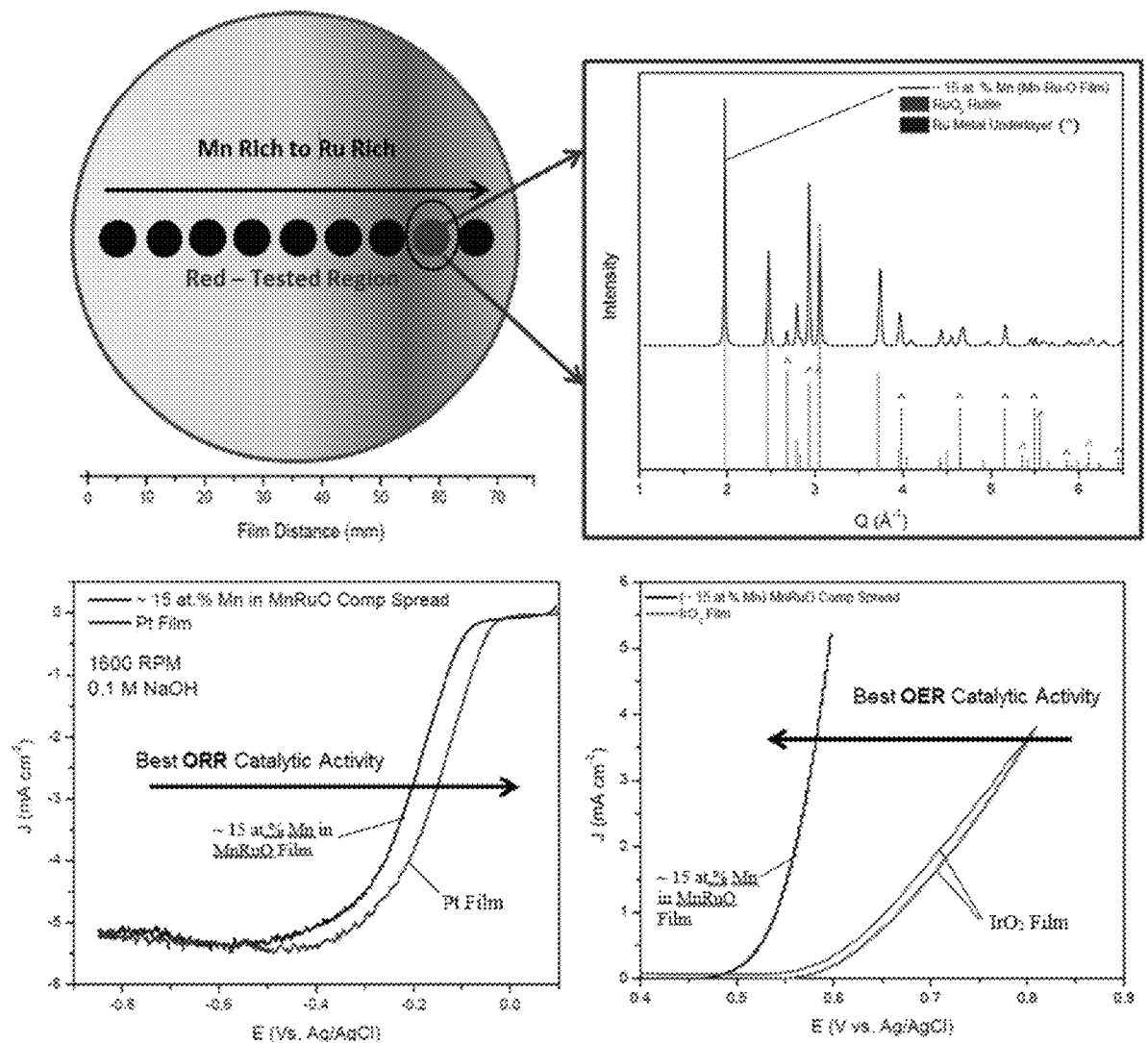
FIG. 3 depicts results of additional electrochemical testing performed on an active compound from $Mn_xRu_{1-x}O_2$ film, as well as an x-ray diffraction (XRD) plot of the electrochemically tested cross-section.

FIG. 3 depicts results of additional electrochemical testing that was performed on the most active spot along the composition spread of the $Mn_xRu_{1-x}O_2$ thin film discussed above. The most active region (designated with a "*" in FIG. 2), which has a surface composition of ~15 atom % Mn, relative to the total amount of Mn and Ru (i.e., x=about 0.15), at the center of the active spot, is circled on the top-left of FIG. 3. X-ray diffraction at the center of the active region confirms that the film region is the $Mn_xRu_{1-x}O_2$ (x~0.15, i.e., 15 atom % Mn at the center) phase (FIG. 3, top-right). In the top-right of FIG. 3, the upper curve ("~15 at. % Mn (Mn—Ru—O Film)") is for the center of the active region that was tested. The peaks under the curve are either rutile $RuO_2$ or Ru Metal Underlayer (the Ru Metal Underlayer peaks are distinguished by the "^" symbol).

The active spot was removed from the composition spread film as a 9×9 mm piece, and electrochemically tested for ORR and OER catalysis through rotating disk electrode voltammetry (RDE) in $O_2$-saturated 0.1 M NaOH (FIG. 3, lower-left). The ORR result of the $Mn_xRu_{1-x}O_2$ film was compared to a standard Pt film, which was tested under the same conditions (1600 rpm). A positive potential sweep up to 0.6 V vs. Ag/AgCl was performed to measure OER catalfysis (FIG. 3, lower-right), and compared to an iridium oxide ($IrO_2$) film standard. $IrO_2$ was chosen as a standard comparison because Ir and $IrO_2$ are very active catalysts for OER. As can be seen, the 15 at. % Mn embodiment outperformed the $IrO_2$ in terms of catalytic activity.

The foregoing results reveal good catalytic activities of $Mn_xRu_{1-x}O_2$ for ORR and OER, with the strongest activity exhibited within a composition range of Mn between 2 and 28 atom % (i.e., where 0.02≤x≤0.28), and, in particular, at approximately 10 to 20 at. % Mn (i.e., where 0.10≤x≤0.20). Moreover, structural measurements, particularly x-ray diffraction, confirm that the $Mn_xRu_{1-x}O_2$ compound retains the same crystal structure (rutile) as pure $RuO_2$ (i.e., the compound is a single phase rutile-type structure) (see FIG. 3).

Particle Synthesis

A $Mn_xRu_{1-x}O_2$ compound was also synthesized as particles.

Stoichiometric amounts of $RuCl_3.3H_2O$ (80 parts) and $MnSO_4$ (12 parts) were mixed in approximately 5 mL of water, and stirred for approximately 30 minutes. Then $KMnO_4$ (8 parts equivalent, 4 mM aqueous solution) was added and stirred for approx. 10 minutes, by which time brown solid precipitated. The solid-liquid suspension was transferred to a Teflon bomb autoclave (20 mL) and was heated at 160° C. for 6 hours. The black precipitate was filtered and washed with copious amounts of water, and was annealed in air at 450° C. for 6 hours. As a comparison, the same procedure was performed with no Ru precursors or Mn precursors to obtain pure $MnO_2$ and $RuO_2$, respectively.

Particle Catalytic Results

The particles were mixed with carbon (Vulcan XC72R, heated to 400° C. for 12 h to make it mix better with water, alcohol, etc.) using a planetary mill to form a catalyst/C mixture (40 wt. % active material by mass). This improves the conductivity and dispersion, which in turn improves the catalytic property. Ink for electrochemical characterization was made using Nafion (0.02 weight %) in 200 proof ethanol. The active material (approx. 4 mg) and the Nafion/ethanol solution (1 mL) were sonicated to form a uniform black ink/suspension using a probe. 5 µL of this ink was deposited/casted on a glassy carbon electrode (d=5 mm. comes out to 80 µg/cm$^2$ oxide). This method is applicable for, e.g., "painting" a catalyst layer for membrane electrode assembly (MEA).

At approximately 20% Mn and 80% Ru ($Mn_{0.2}Ru_{0.8}O_2$), the sample retains the same crystal structure (rutile) as $RuO_2$, with Mn atoms incorporated into the structure as indicated by x-ray diffraction (FIG. 4); evidence of Mn incorporation comes from the slight shifts in the diffraction peaks.

Figure 4:
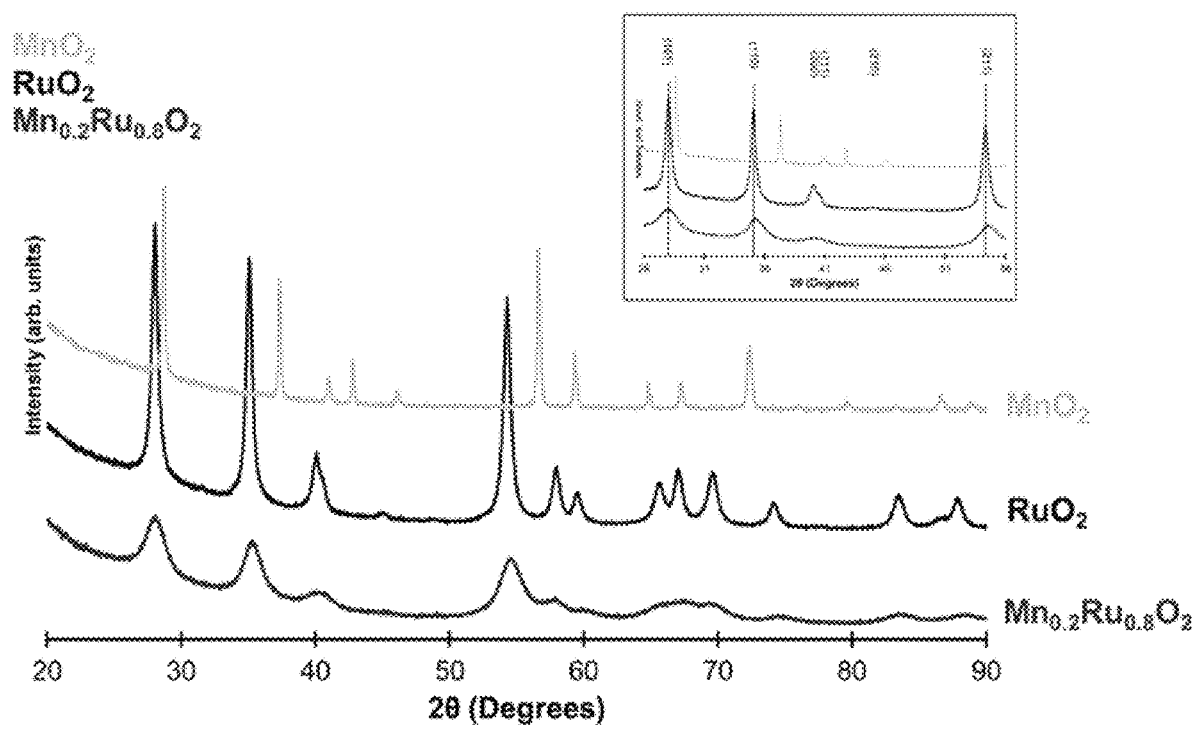
FIG. 4 is an X-Ray Diffraction (XRD) plot showing diffraction patterns of $Mn_{0.2}Ru_{0.8}O_2$ (using a powder/particle embodiment of the invention described herein), as well as the embodiment's constituents, $RuO_2$ and $\beta$-$MnO_2$.

In particular, FIG. 4 shows X-ray diffraction patterns of $Mn_{0.2}Ru_{0.8}O_2$ (an embodiment of the invention described herein) and its constituents ($RuO_2$ and β-$MnO_2$). Some peaks of $Mn_{0.2}Ru_{0.8}O_2$ are slightly shifted from $RuO_2$ (also see inset), indicating some change in the lattice constant (incorporation of smaller atoms like Mn). There is also no evidence of $MnO_2$ by itself (the bottom trace, for $Mn_{0.2}Ru_{0.8}O_2$, would have peaks where the top trace, for $MnO_2$, does), indicating that Mn atoms are incorporated into $RuO_2$ structure. Intensities are a function of crystallite size and/or degree of crystallinity.

The particles were then mixed with carbon black, loaded onto an electrode (80 µg/cm$^2$), and electrochemically tested. The results are summarized in FIGS. 5 and 6, which not only show nearly identical activity towards ORR and OER to the thin film sample, but are very comparable to platinum, a common commercial catalyst.

Figure 5:
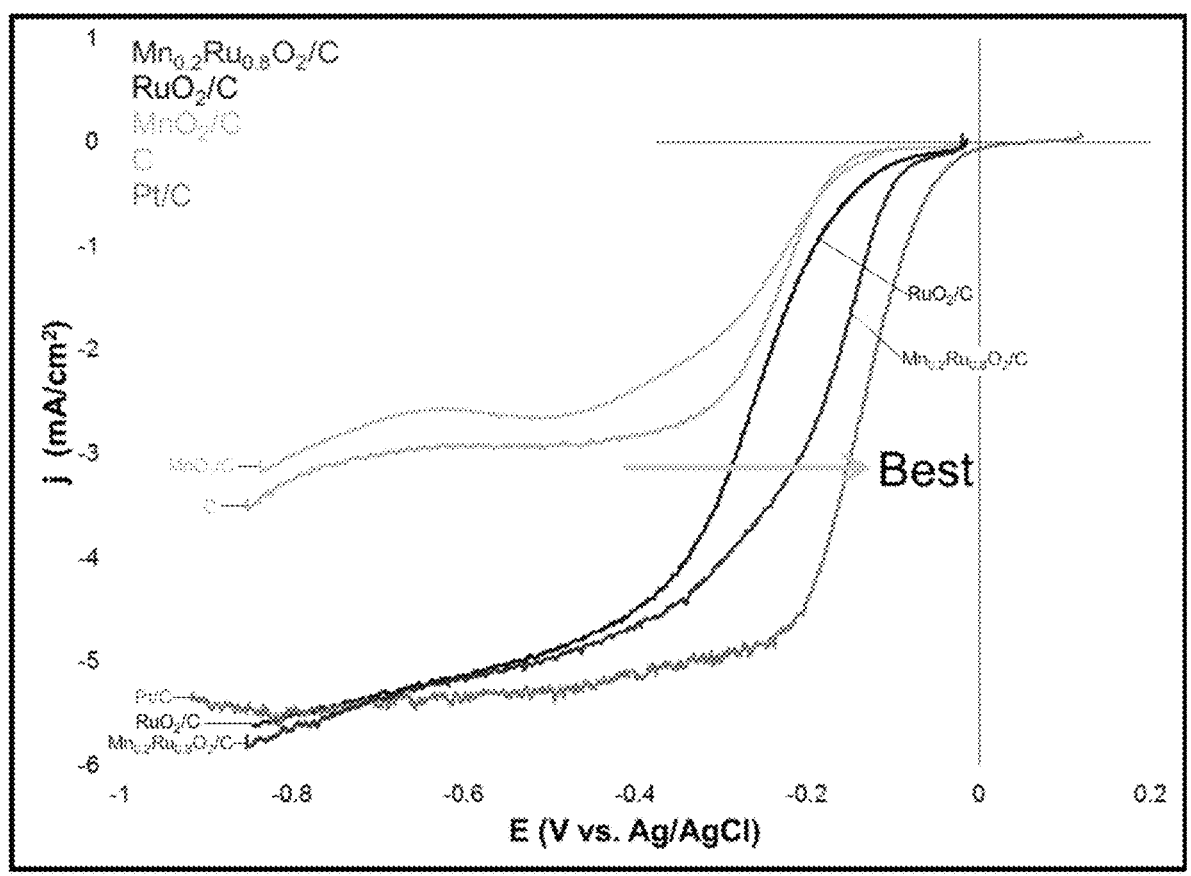
FIG. 5 is an ORR activity comparison chart showing ORR activity for a $Mn_{0.2}Ru_{0.8}O_2$ powder/particle embodiment as well as other tested materials.

In particular, FIG. 5 provides an ORR activity comparison of $Mn_{0.2}Ru_{0.8}O_2$/C particle mixture, $RuO_2$/C mixture, β-$MnO_2$/C mixture, C, and Pt/carbon black mixture using rotating disk voltammetry (1600 rpm) in $O_2$-saturated 0.1 M NaOH. The letter C corresponds to carbon black, a conductive support material. Mixing carbon black with catalyst materials is a standard practice to facilitate good electrical conduction. At operating voltage of a typical fuel cell cathode (ca. −0.1 V to −0.15 V vs. Ag/AgCl), the current obtained from the inventive embodiment is comparable to that from Pt, at significantly lower cost.

Figure 6:
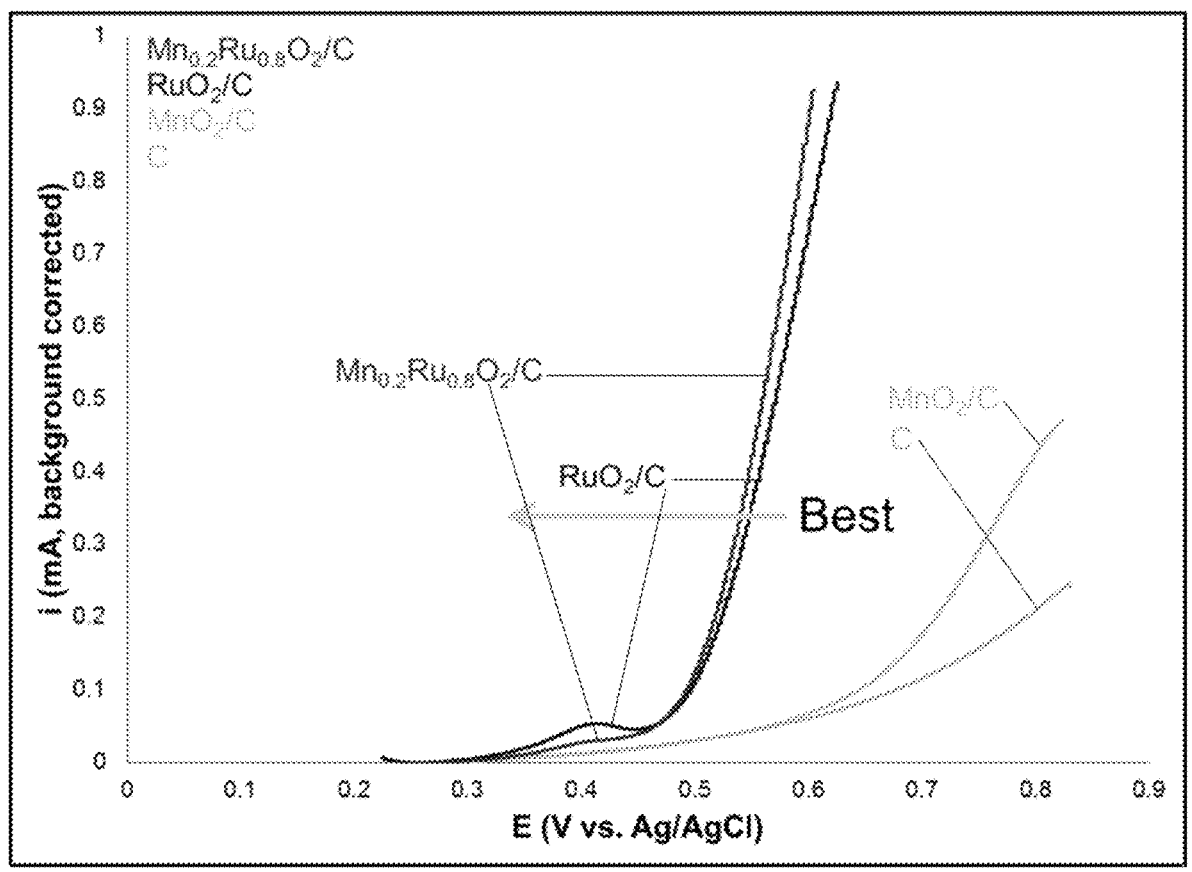
FIG. 6 is an OER activity comparison chart showing OER activity for a $Mn_{0.2}Ru_{0.8}O_2$ powder/particle embodiment as well as other tested materials.

FIG. 6 provides an OER activity comparison of $Mn_{0.2}Ru_{0.8}O_2/C$ particle mixture, $RuO_2/C$ particle mixture, β-$MnO_2/C$ particle mixture and carbon black in $O_2$-saturated 0.1M NaOH. In this graph, the desirable result is getting high current density in low potentials (left). $Mn_{0.2}Ru_{0.8}O_2$ shows the best kinetics (steeper slope).

OER Cell Performance Testing

Figure 7:
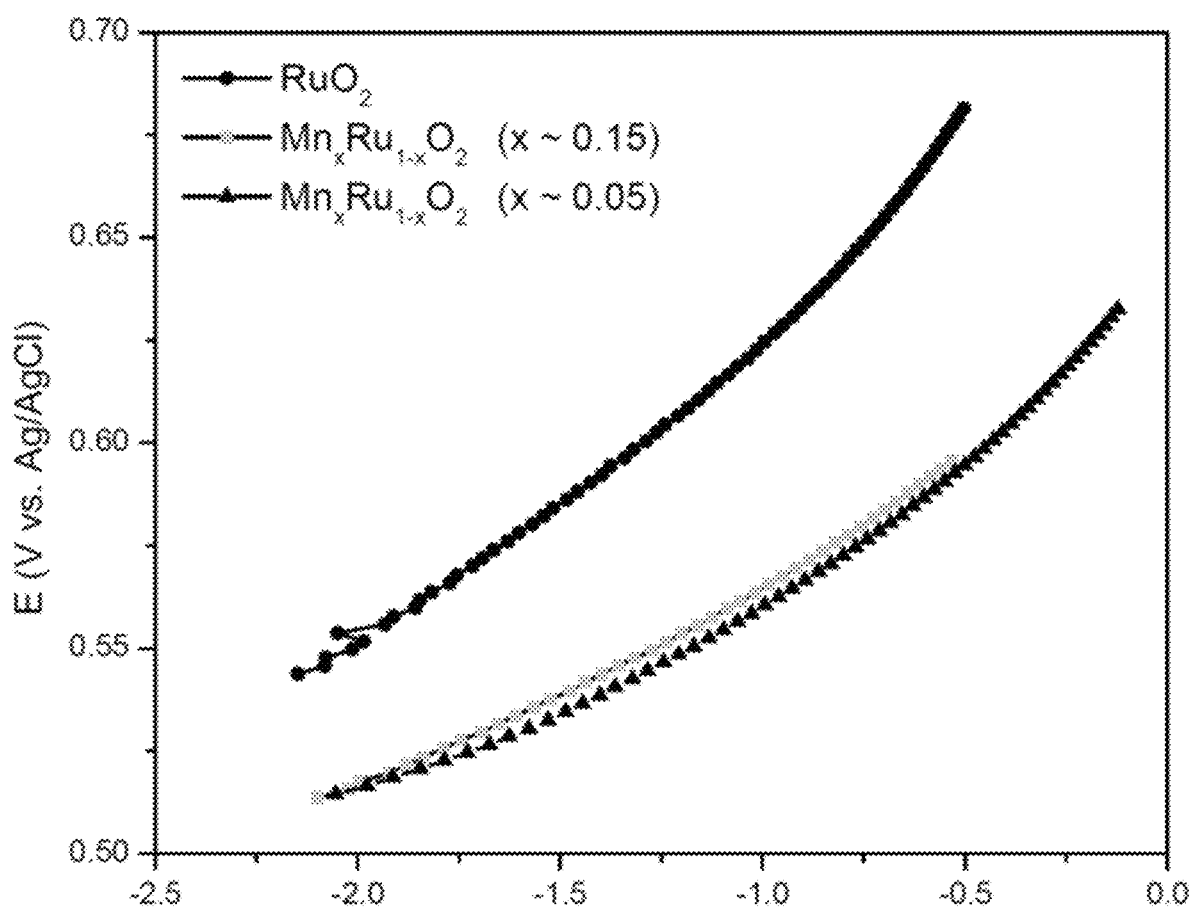
FIG. 7 depicts a plot showing OER cell performance for two $Mn_xRu_{1-x}O_2$ embodiments (where x~0.15 and x~0.05), and a $RuO_2$ sample for comparison.

FIG. 7 depicts a plot showing cell performance (cell voltage vs. the current (log scale)) for two $Mn_xRu_{1-x}O_2$ embodiments (where x~0.15 and x~0.05), and a $RuO_2$ sample for comparison ($RuO_2$ is a well-known anode catalyst for OER, and is often used for control experiments when studying alternative OER catalysts). Testing was done under alkaline (high pH) conditions (0.1 M NaOH). These conditions result in a far different environment in terms of performance and catalytic behavior as compared to, e.g., cells utilizing Nafion-based material as the electrolytic membrane, which facilitates rapid $H^+$ transport (catalysts in such cells are subjected to a highly acidic (low pH) environment).

For an electrolytic cell, a lower cell voltage at a given current setting indicates higher performance. As shown in FIG. 7, the OER activity of the tested inventive embodiments ($Mn_xRu_{1-x}O_2$; where x~0.15 and x~0.05) either exceeds or is on par with pure $RuO_2$, thereby demonstrating an advantage of the inventive embodiments.

Quaternary Metal Oxide Examples

Preliminary results of quaternary compositions (i.e., compounds of formula (I') wherein M is selected from Co, Ni, and Fe) spreads indicate that the compositions exhibit excellent activity for ORR and/or OER. The initial results also suggest that a quaternary (or higher level) Mn—Ru—O systems containing either Fe, Co, or Ni (or a combination of these transition metals) may further enhance ORR and/or OER activity relative to the ternary Mn—Ru—O compounds of formula (I"). It is estimated that these quaternary oxide systems are most active within a composition range where the summed Mn and M (M=Fe, Ni, or Co) content is between 2-30, e.g., 2-28 atom %, relative to the total amount of Mn, M, and Ru in the compounds (i.e., 0.02≤(x+y)≤0.30, e.g., 0.02≤(x+y)≤0.28).

Cyclic voltammetry (CV) measurements were performed on various composition spread think films using instrumentation described herein. CVs are a common technique for screening potential catalysts materials for both oxygen reduction and oxygen evolution reaction (ORR and OER). Results are shown in FIGS. 8 and 9.

Figure 8:
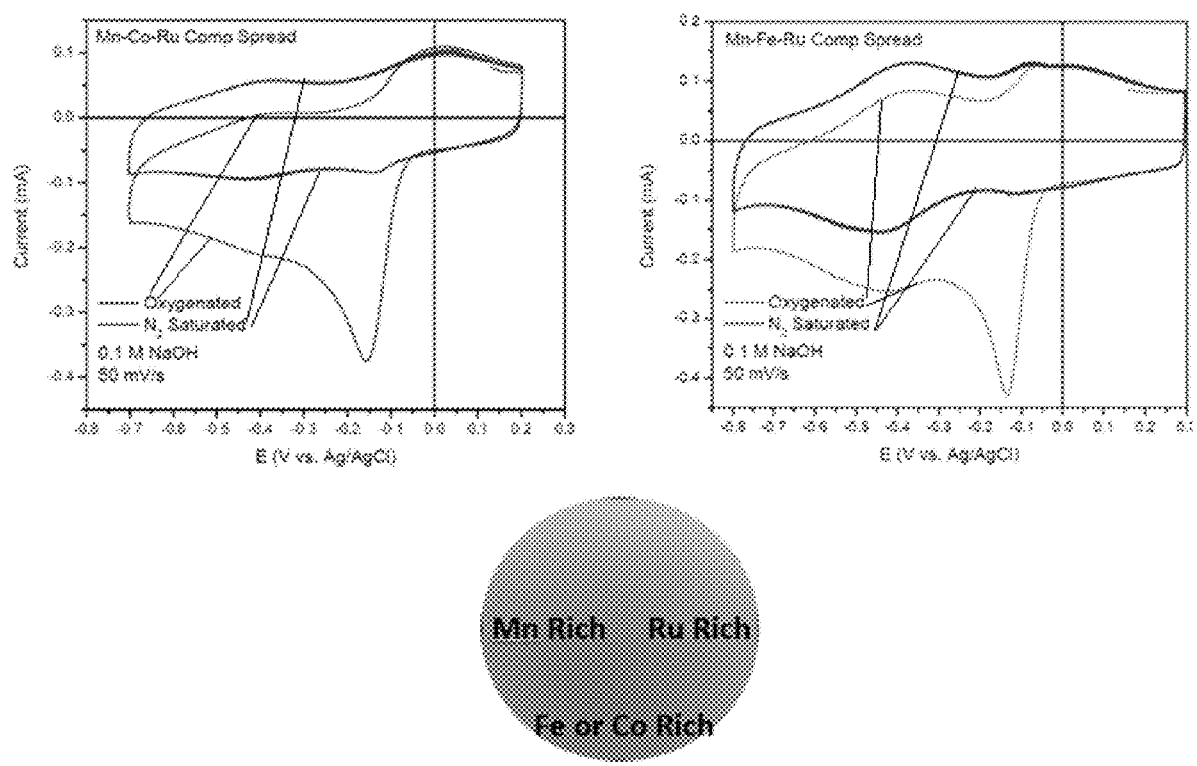
FIG. 8 shows plots and a related diagram. The plots indicate that initial measurements of quaternary composition oxide films containing Fe and Co show strong ORR activity.

FIG. 8 shows plots and a related illustration indicating that initial measurements of quaternary composition oxide films containing Fe and Co show strong ORR activity. These measurements were taken near the Ru-rich and Fe,Co rich region.

Figure 9:
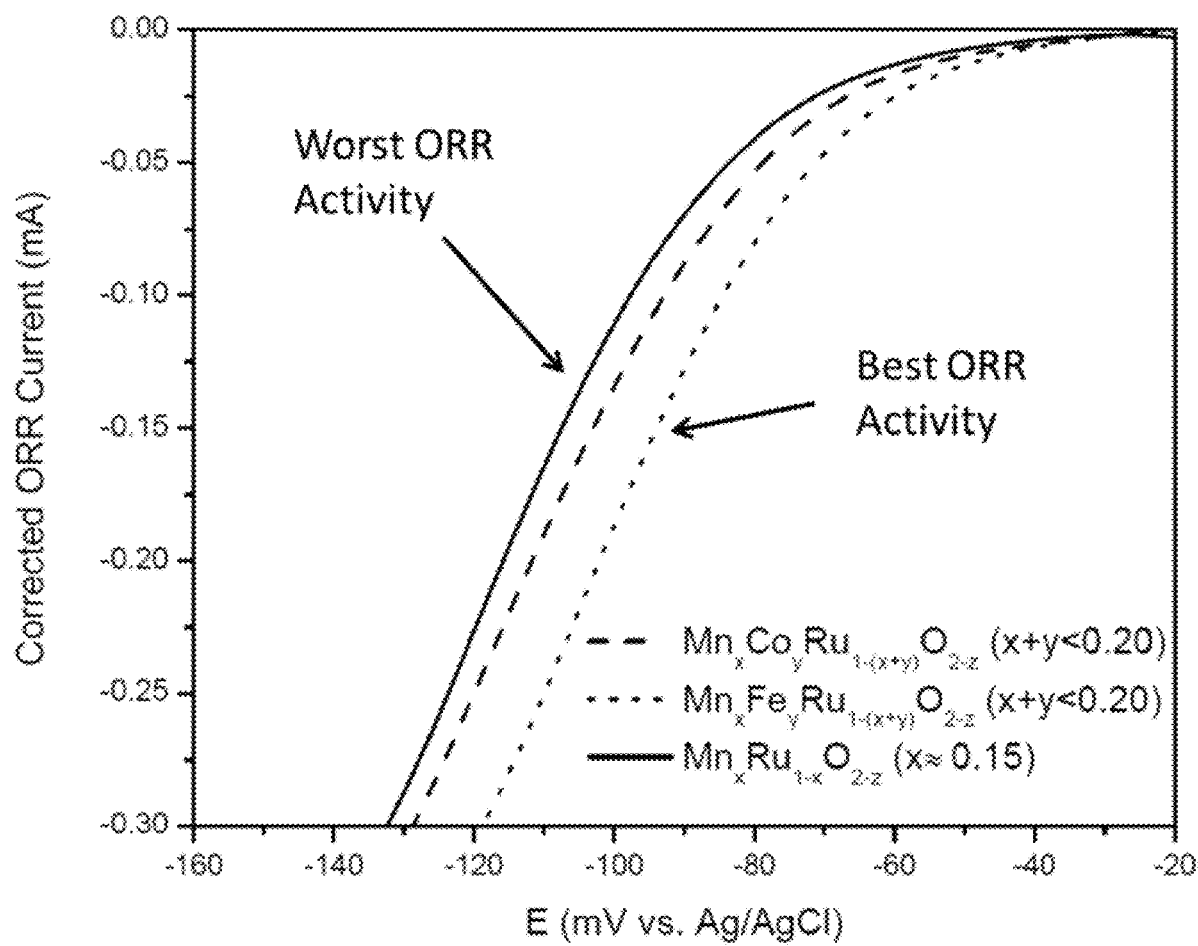
FIG. 9 shows ORR data that were taken from regions of the quaternary composition oxide film embodiments where the phase is $(Mn,Co)_{x+y}(Ru)_{1-(x+y)}O_2$ and $(Mn,Fe)_{x+y}(Ru)_{1-(x+y)}O_2$ (x+y<~30 at. %).

FIG. 9 shows ORR data that were taken from regions of the quaternary composition oxide film embodiments where the likely phase is $(Mn,Co)_{x+y}(Ru)_{1-(x+y)}O_2$ and $(Mn,Fe)_{x+y}(Ru)_{1-(x+y)}O_2$ ((x+y)<0.30). Both quaternary oxide films exhibit superior ORR activities relative to the ternary Mn—Ru—O. In particular, FIG. 9 provides a partitioned cyclic voltammetry (CV) plot, which measures the activity of oxygen reduction reaction (ORR). Electrical current was measured when the applied voltage is moving in the negative direction at a constant rate. The downward curve corresponds to electrical current produced from ORR. The plot shows the ORR activity of three distinct catalyst materials: Mn—Ru—O, Mn—Co—Ru—O, and Mn—Fe—Ru—O. The addition of Co and Fe appears to enhance ORR catalytic activity.

Figure 10:
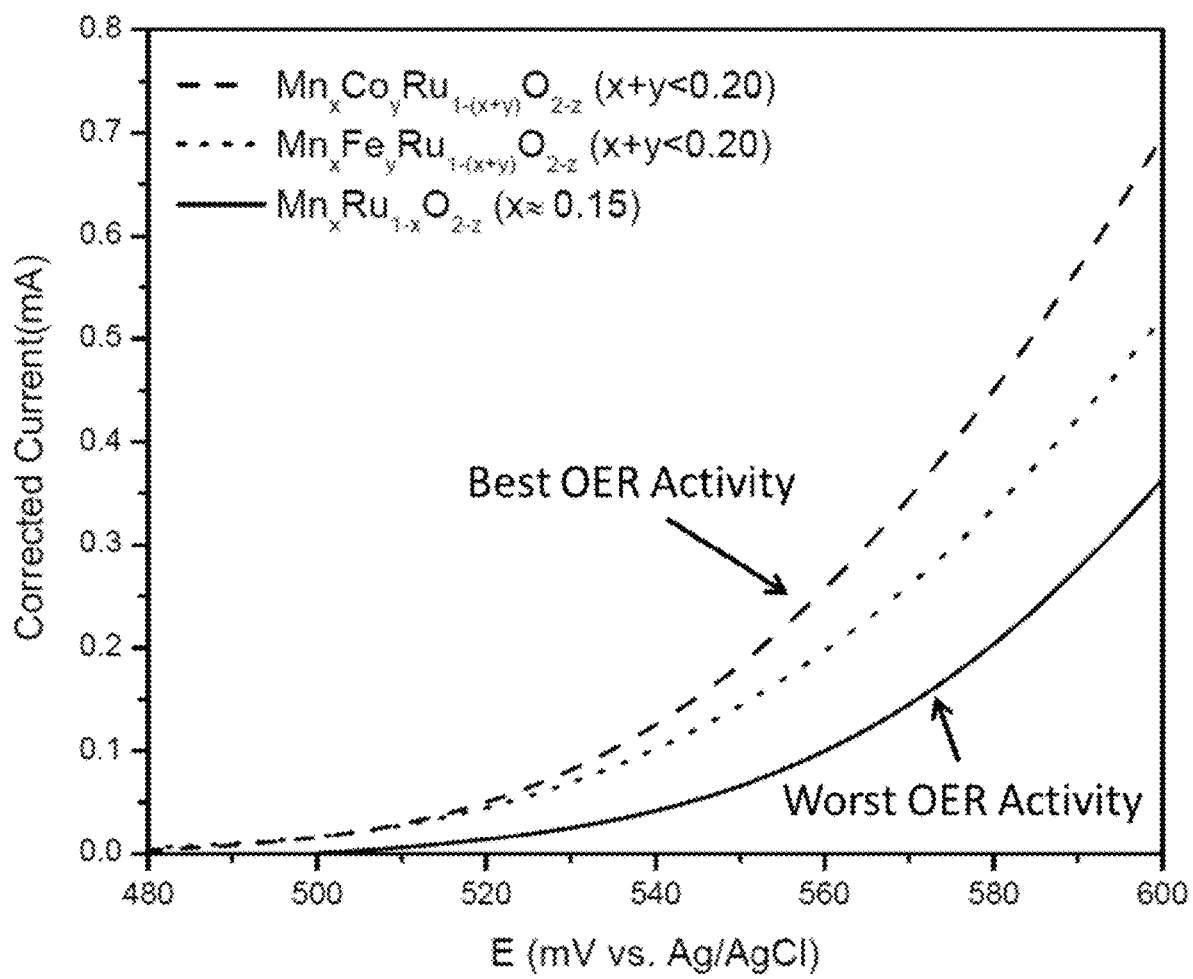
FIG. 10 shows OER data that were taken from regions of the quaternary composition oxide film embodiments where the phase is $(Mn,Co)_{x+y}(Ru)_{1-(x+y)}O_2$ and $(Mn,Fe)_{x+y}(Ru)_{1-(x+y)}O_2$ (x+y<~30 at. %).

FIG. 10 shows OER data that were taken from regions of the quaternary composition oxide film embodiments where the likely phase is $(Mn,Co)_{x+y}(Ru)_{1-(x+y)}O_2$ and $(Mn,Fe)_{x+y}(Ru)_{1-(x+y)}O_2$ ((x+y)<0.30). Both quaternary oxide films exhibit superior OER activities relative to the ternary Mn—Ru—O. In particular, FIG. 10 provides a CV portion that measured electrical current corresponding to oxygen evolution reaction (OER), which is activated when the voltage is moving in the positive direction at a constant rate. Because OER is the reverse counterpart to ORR, the electrical current curves upward (positive current) at higher voltages. The plot shows the OER activity of three different catalyst materials: Mn—Ru—O, Mn—Co—Ru—O, and Mn—Fe—Ru—O. The addition of Co and Fe also enhances OER catalytic activity.

FIGS. 8-10 evidence that incorporation of either iron (Fe) or cobalt (Co) into the existing manganese-ruthenium (Mn—Ru) oxide structure ($Mn_xRu_{1-x}O_2$) even further enhances ORR and OER activity. Complex quaternary ($Mn_xFe_yRu_{1-x-y}O_2$ and $Mn_xFe_yRu_{1-x-y}O_2$) oxide catalysts of the same base structure as $Mn_xRu_{1-x}O_{2-z}$ are formed. Nickel is believed to behave similarly to iron and cobalt.

ORR Comparative Data for Single Phase and Phase Separated Compounds

ORR testing was performed as described above on samples of a single phase ternary compound of formula (I), a phase separated compound having an atomic composition corresponding to the ternary compound of formula (I), and pure $RuO_2$.

Figure 11:
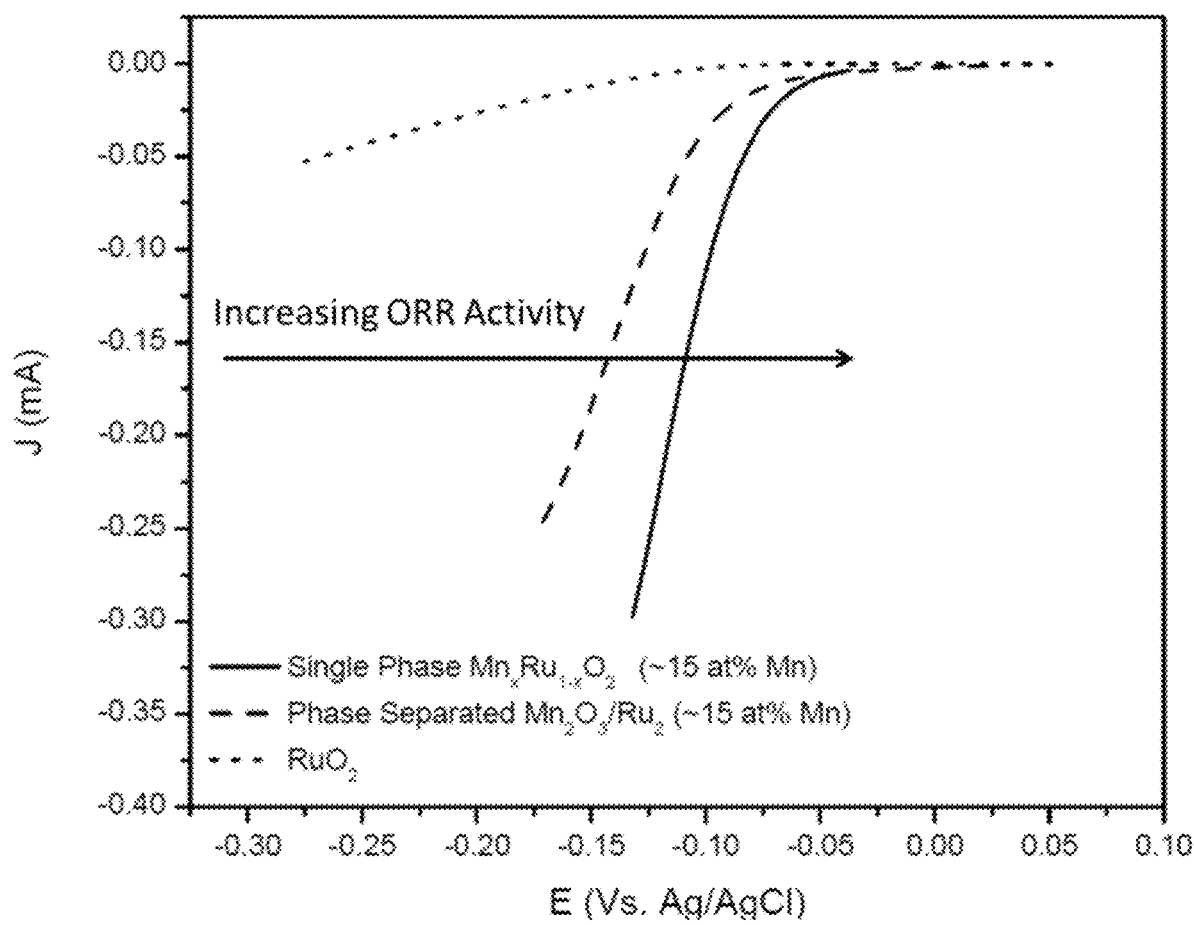
FIG. 11 provides ORR curves for: single phase $Mn_xRu_{1-x}O_2$ (~15 atomic % Mn relative to the sum of Mn and Ru, i.e., x~0.15), phase separated $Mn_2O_3/RuO_2$ (~15 atomic % Mn relative to the sum of Mn and Ru), and pure $RuO_2$.

FIG. 11 provides ORR curves for: single phase $Mn_xRu_{1-x}O_2$ (~15 atomic % Mn relative to the sum of Mn and Ru, i.e., x~0.15), phase separated $Mn_2O_3/RuO_2$ (~15 atomic % Mn relative to the sum of Mn and Ru), and pure $RuO_2$. While both the single phase $Mn_xRu_{1-x}O_{2-y}$ (x~15 at % Mn) and the phase separated $Mn_2O_3/RuO_2$ (~15 at % Mn) have the same composition—or the same amount of Mn—the ORR activity of the single phase $Mn_xRu_{1-x}O_{2-y}$ is clearly better. Pure $RuO_2$ is predictably the least active out of the three. These results establish that atomically mixing Mn into $RuO_2$ to form rutile-type $Mn_xM_yRu_{1-(x+y)}O_2$, as opposed to keeping them phase separated, enhances ORR activity.

Clauses

The following clauses describe certain non-limiting embodiments of the invention.

Clause 1. A metal oxide compound of formula (I'):

$$Mn_xM_yRu_{1-(x+y)}O_2 \qquad (I')$$

wherein the compound is a single phase rutile-type structure, and wherein

M is selected from the group consisting of Co, Ni, and Fe, and combinations thereof;

x>0;

y>0; and 0.02≤(x+y)≤0.30.

Clause 2. The metal oxide compound according to Clause 1, wherein 0.02<x<0.28 and 0<y<0.20.

Clause 3. The metal oxide compound according to Clause 1 or Clause 2, wherein said compound is a quaternary compound and M is selected from Co, Ni, and Fe.

Clause 4. The metal oxide compound according to Clauses 1 to 3, wherein M is Co.

Clause 5. The metal oxide compound according to Clauses 1 to 3, wherein M is Ni.

Clause 6. The metal oxide compound according to Clauses 1 to 3, wherein M is Fe.

Clause 7. The metal oxide compound according to Clauses 1 to 6, wherein $0.10 \leq x \leq 0.20$.

Clause 8. The metal oxide compound according to Clauses 1 to 7, wherein $0 < y < 0.15$.

Clause 9. The metal oxide compound according to Clauses 1 to 8, wherein all or substantially all of the Mn atoms present in the compound are atomically incorporated into the rutile-type structure.

Clause 10. The metal oxide compound according to Clauses 1 to 9, wherein the source of the Mn present in the compound is $Mn_2O_3$ or beta "β" phase $MnO_2$.

Clause 11. An electro-catalyst for use under alkaline conditions comprising a metal oxide compound according to formula (I):

$$Mn_xM_yRu_{1-(x+y)}O_2 \quad (I)$$

wherein the compound is a single phase rutile-type structure, and wherein

M is selected from the group consisting of Co, Ni, and Fe, and combinations thereof;
$x > 0$;
$y \geq 0$; and
$0.02 \leq (x+y) \leq 0.30$.

Clause 12. The electro-catalyst according to Clause 11, wherein Mn atoms are incorporated into the structure of $RuO_2$, and said electro-catalyst does not comprise $MnO_2$ by itself.

Clause 13. The electro-catalyst according to Clause 11 or Clause 12, wherein said electro-catalyst does not comprise a rare earth metal.

Clause 14. A film comprising the metal oxide compound of formula (I') according to Clauses 1 to 10 or the metal oxide compound of formula (I) as recited in any one of Clauses 11 to 13.

Clause 15. The film according to Clause 14, having a thickness of 150 to 400 nm.

Clause 16. A solid particle comprising the metal oxide compound according to any one of Clauses 1 to 10 or the electro-catalyst according to Clauses 11 to 13.

Clause 17. A membrane electrode assembly (MEA) comprising the metal oxide compound according to Clauses 1 to 10 or the electro-catalyst according to any one of Clauses 11 to 13.

Clause 18. A fuel cell comprising the metal oxide compound according to any one of Clauses 1 to 10 or the electro-catalyst according to Clauses 11 to 13.

Clause 19. An alkaline fuel cell catalyst comprising the metal oxide compound according to Clauses 1 to 10 or the electro-catalyst according to any one of Clauses 11 to 13.

Clause 20. An electro-catalytic process, e.g., performed at a pH>7, wherein said process comprises use of the metal oxide compound according to Clauses 1 to 10 or the electro-catalyst according to Clauses 11 to 13.

Clause 21. The electro-catalytic process according to Clause 20, wherein the process comprises an oxygen reduction reaction (ORR).

Clause 22. The electro-catalytic process according to Clause 20, wherein the process comprises an oxygen evolution reaction (OER).

Clause 23. The electro-catalytic process according to Clause 20, wherein the process comprises an oxygen reduction reaction (ORR) and an oxygen evolution reaction (OER).

Clause 24. A cathode comprising the metal oxide compound according to any one of Clauses 1 to 10 or the electro-catalyst according to Clauses 11 to 13.

Clause 25. A battery, e.g., an air battery, comprising the metal oxide compound according to Clauses 1 to 10, or the electro-catalyst according to any one of Clauses 11 to 13.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a composition or article that "comprises", "has", "includes" or "contains" one or more features possesses those one or more features, but is not limited to possessing only those one or more features.

As used herein, the terms "comprising," "has," "including," "containing," and other grammatical variants thereof encompass the terms "consisting of" and "consisting essentially of."

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

The invention claimed is:

1. A metal oxide compound of formula (I'):

$$Mn_xM_yRu_{1-(x+y)}O_2 \quad (I'),$$

wherein the compound is a single phase rutile-type structure, and wherein

M is selected from the group consisting of Co, Ni, and Fe, and combinations thereof;

x>0;

y>0; and 0.02≤(x+y)≤0.30.

2. The metal oxide compound according to claim 1, wherein 0.02<x<0.28 and 0<y<0.20.

3. The metal oxide compound according to claim 1, wherein said compound is a quaternary compound and M is selected from Co, Ni, and Fe.

4. The metal oxide compound according to claim 3, wherein M is Co.

5. The metal oxide compound according to claim 3, wherein M is Ni.

6. The metal oxide compound according to claim 3, wherein M is Fe.

7. The metal oxide compound according to claim 1, wherein 0.10≤x≤0.20.

8. The metal oxide compound according to claim 1, wherein 0<y<0.15.

9. The metal oxide compound according to claim 1, wherein all Mn atoms present in the compound are atomically incorporated into the rutile-type structure.

10. The metal oxide compound according to claim 1, wherein the source of the Mn present in the compound is $Mn_2O_3$ or beta "β" phase $MnO_2$.

11. An electro-catalyst for use under alkaline conditions comprising a metal oxide compound according to formula (I'):

$$Mn_xM_yRu_{1-(x+y)}O_2 \quad (I'),$$

wherein the compound is a single phase rutile-type structure, and wherein

M is selected from the group consisting of Co, Ni, and Fe, and combinations thereof;

x>0;

y≥0; and 0.02≤(x+y)≤0.30.

12. The electro-catalyst according to claim 11, wherein Mn atoms are incorporated into the structure of $RuO_2$, and said electro-catalyst does not comprise $MnO_2$ by itself.

13. The electro-catalyst according to claim 11, wherein said electro-catalyst does not comprise a rare earth metal.

14. A film comprising the metal oxide compound of formula (I) according to claim 11.

15. The film according to claim 14, having a thickness of 150 to 400 nm.

16. A solid particle comprising the metal oxide compound according to claim 11.

17. A membrane electrode assembly (MEA) comprising the metal oxide compound of formula (I) according to claim 11.

18. An alkaline fuel cell catalyst comprising the electro-catalyst according to claim 11.

19. An electro-catalytic process performed at a pH>7, wherein said process comprises performing an oxygen reduction reaction (ORR) or an oxygen evolution reaction (OER) in the presence of the electro-catalyst according to claim 11.

20. A cathode or an air battery comprising the metal oxide compound of formula (I) according to claim 11.

* * * * *